United States Patent [19]

Meyn

[11] Patent Number: 5,340,355
[45] Date of Patent: Aug. 23, 1994

[54] APPARATUS FOR ORIENTING BIRDS, WHICH ARE SUPPLIED BY A BELT CONVEYOR, WITH THEIR HEADS IN THE DIRECTION OF CONVEYANCE

[75] Inventor: Cornelis Meyn, Oostzaan, Netherlands

[73] Assignee: Machinefabriek Meyn B.V., Oostzaan, Netherlands

[21] Appl. No.: 155,901

[22] Filed: Nov. 19, 1993

Related U.S. Application Data

[63] Continuation of Ser. No. 78,400, Jun. 17, 1993, abandoned.

[30] Foreign Application Priority Data

Jun. 23, 1992 [NL] Netherlands ............. 9201103

[51] Int. Cl.$^5$ ............. A22C 21/00; A23C 7/02
[52] U.S. Cl. ............. 452/179; 452/183; 452/53
[58] Field of Search ............. 452/179, 177, 183, 53; 119/846

[56] References Cited

U.S. PATENT DOCUMENTS

| 1,689,920 | 10/1928 | Heath ............. 452/179 |
|---|---|---|
| 2,602,183 | 7/1952 | Christiansen ............. 452/179 |
| 4,215,654 | 8/1980 | Parker, Jr. ............. 452/178 |
| 4,736,710 | 4/1988 | Nicolai ............. 119/82 |
| 5,088,959 | 2/1992 | Heemskerk ............. 452/183 |
| 5,129,857 | 7/1992 | Kepter et al. ............. 452/179 |

FOREIGN PATENT DOCUMENTS

| 8694775 | 6/1977 | Australia . |
|---|---|---|
| 0145077 | 6/1985 | European Pat. Off. . |
| 0472984A1 | 3/1992 | European Pat. Off. . |
| 3231862A1 | 7/1983 | Fed. Rep. of Germany . |
| 7611231 | 10/1976 | Netherlands . |
| 8501812 | 1/1987 | Netherlands . |

OTHER PUBLICATIONS

International Search Report with Translation.

*Primary Examiner*—Willis Little
*Attorney, Agent, or Firm*—Dority & Manning

[57] ABSTRACT

Apparatus is provided for orienting birds, which are applied by a belt conveyor, with their heads in the direction of conveyance. The apparatus comprises two positioning means located alongside each other and rotating around a vertical axis defining therebetween a passage for the birds to be oriented. At the passage, the one positioning means has a circumferential velocity directed in the direction of conveyance of the conveyor and the other positioning means has a circumferential velocity directed opposite to the direction of conveyance. Further, auxiliary means are provided for supplying the birds to the positioning means facing with their head or facing with their tail in the direction of conveyance.

18 Claims, 2 Drawing Sheets

APPARATUS FOR ORIENTING BIRDS, WHICH ARE SUPPLIED BY A BELT CONVEYOR, WITH THEIR HEADS IN THE DIRECTION OF CONVEYANCE

This is a continuation of application U.S. Ser. No. 08/078,400, filed Jun. 17, 1993, which was abandoned upon the filing hereof.

BACKGROUND OF THE INVENTION

The invention relates to an apparatus for orienting birds, which are supplied by a belt conveyor, with their heads in the direction of conveyance.

When automatedly processing birds it may be required that these birds, that are still living at that moment, are oriented in the same way, for example facing each with the head into the direction of conveyance. Birds oriented thus may simply be engaged by processing apparatuses, such as for example an apparatus for suspending the birds with their legs into the hooks of a suspension conveyor known per se.

Apparatuses which have already been proposed in the past for positioning birds do not appear to work optimally in practice. The chance that an individual birds is not correctly positioned is considerable, and this often can lead to failures.

OBJECTS AND SUMMARY OF THE INVENTION

It is an object of the invention to provide an apparatus of the type referred to above wherein a high percentage of the supplied birds can be positioned correctly. Additional objects and advantages of the invention will be set forth in part in the description which follows, and in part will be obvious from the description, or may be learned by practice of the invention.

The apparatus according to the invention is characterized by two positioning means located substantially alongside each other and rotating around vertical axes, and defining therebetween a passage for the birds to be oriented, wherein the positioning means rotate in the same sense such that, at the passage, the one positioning means has a circumferential velocity directed in the direction of conveyance of the conveyor and the other positioning means has a circumferential velocity directed opposite to the direction of conveyance. Further auxiliary means are provided for supplying the birds to the positioning means facing with their head or facing with their tail in the direction of conveyance.

When a bird enters the passage between the two positioning means with its head facing in the direction of conveyance (thus already correctly positioned), the one positioning means tries to move the bird in correspondence with the direction of conveyance, because this one positioning means has, at the passage, a circumferential velocity directed in the direction of conveyance. The other positioning means has, at the passage, a circumferential velocity opposite to the direction of conveyance and this positioning means can hardly exert a force onto the bird because its surface moves in the direction of the feathers of the bird. Thus an already correctly positioned bird will remain correctly positioned and will pass the passage in this position.

If however a bird enters the passage between the two positioning means with its tail facing in the direction of conveyance, the one positioning means again will try to move the bird through the passage in the direction of conveyance. However, as a result of its circumferential velocity at the passage, the other positioning means moves opposite to the direction of conveyance and opposite to the direction of the feathers of the bird, such that in combination with the force exerted by the one positioning means, a rotation of the bird around a vertical axis will occur until the bird faces with its head in the direction of conveyance. Thus the bird will be positioned when leaving the passage (with its head facing in the direction of conveyance).

The auxiliary means take care of supplying the birds to the positioning means in one of both previously mentioned positions.

A preferred embodiment of the apparatus according to the invention is characterized in that a light source is positioned at that side of the one positioning means which faces away from the passage. The light source attracts the attention of the birds which are supplied with their head facing in the direction of conveyance. As a result, it is obviated that birds, which are correctly positioned like this, will move their head too far in the direction of the other positioning means.

Further it is preferred, that, as seen in the direction of conveyance, behind the other positioning means an air jet-emitting element is positioned. The air jet prevents that a bird, which has passed the passage between the two positioning means, turns it head too far in the direction of the other positioning means, which could lead to an undesired rotation of the bird.

Further it is possible, that as seen in the direction of conveyance, behind the other positioning means an auxiliary positioning means is positioned rotating around a vertical axis, which together with the one positioning means defines a passage for the birds. This passage has a circumferential velocity generated thereat directed in the direction of conveyance, wherein the one positioning means and the auxiliary positioning means, substantially transverse to the direction of conveyance, are position alongside each other. In this manner, the one positioning means and the other positioning means as seen in the direction of conveyance, are staggered relative to each other.

As a result of the cooperation between the one and the other positioning means, the bird is positioned with its head facing in the direction of conveyance, in correspondence with the above. As a result of the cooperation between the one positioning means and the auxiliary positioning means, the bird can then be moved in the direction of a following processing apparatus, such as an apparatus for suspending the birds. Of course this special embodiment can be combined with an air jet-emitting element and a light source.

Further, it is handy when the auxiliary means comprise at least two rolls rotating around a vertical axis and defining a passage for the birds, that the rolls both have a circumferential velocity directed in the direction of conveyance. Using these rolls, birds sitting transverse to the direction of conveyance can be oriented in the direction of conveyance with their head or their tail.

Further, it is possible that between the rolls and the positioning means a stationary bird guide extends obviating a rotation of the birds. After leaving this stationary bird guide, the birds directly reach both positioning means.

Between the rolls and the bird guide one or more guide rolls can be positioned, which supply the birds from the rolls in the bird guide.

Further, it is advantageous if at least one of the positioning means has a rough surface, and for example exists of a brush. Such brushes have, when moving in the direction of the feathers of the bird a low resistance, whereas they can exert a large force on the birds opposite to the direction of the feathers. Of course also the auxiliary positioning means, the rolls and guiding rolls could exist of such brushes.

In correspondence with a special embodiment of the apparatus according to the invention, the one positioning means has a rough surface and the other positioning means has a smooth one, wherein said rough positioning means has a circumferential velocity directed in the direction of conveyance of the conveyor and said smooth positioning means has a circumferential velocity directed opposite to the direction of conveyance, whereas the smooth positioning means further has a circumferential recess at the level of the head of birds to be supplied.

When a bird enters the passage between the two positioning means with its head facing in the direction of conveyance (thus already correctly positioned) the rough surface of the one positioning means will move the bird forward. The smooth surface of the other positioning means however can hardly engage the bird, because the respective foremost part of the bird, namely the head, is positioned at the circumferential recess of the smooth positioning means. Thus, an already correctly positioned bird will remain correctly positioned. If however a bird enters the passage between the two positioning means facing with its tail into the direction of conveyance of rotation of the bird will occur. For this rotation, the rough positioning means moves the one side of the bird in the direction of conveyance, and the smooth positioning means will engage the tail of the bird (which does not fit into the circumferential recess), which is larger in comparison to the head, with enough force such that said respective side of the bird is moved opposite to the direction of conveyance. This will result in a rotation of the bird around a vertical axis.

It is noted that the smooth surface of one of the positioning means contributes advantageously to not rotating an already correctly positioned bird, the smooth surface not getting much grip onto the bird. Only if a bird is supplied wrongly positioned so that a side part of the bird will engage the smooth positioning means, will the bird be moved along with sufficient force to make it rotate.

Constructively, it is advantageous if the positioning means exist of rolls.

In a preferred embodiment of the apparatus according to the invention, the smooth roll has the shape of an hour glass. Further, it is advantageous if the rough roll exists of a brush.

The operation of this special embodiment of the apparatus according to the invention may be further optimized by an embodiment in which the smooth roll is staggered relative to the rough roll in the direction of conveyance. Ahead of the rolls, a bird guide is provided extending under an angle relative to the direction of conveyance and substantially towards the smooth roll. By this bird guide, which is substantially directed towards the smooth roll, a supplied bird is somewhat inclined relative to the belt conveyor. Thus, the tail of a wrongly positioned bird effectively engages the smooth roll. At the same moment, the rough roll, as a result of the staggered location of the smooth relative to the rough roll, will effectively engage the head of the bird, which will be displaced in the forward direction.

An embodiment is also advantageous in which the bird guide comprise a first guide plate, in the extension of which substantially the rotation axis of the smooth roll is positioned, and a second guide plate, the extension of which nearly touches the circumference of the rough roll directed towards the passage. This embodiment especially offers and advantageous effect when a bird is supplied in an already correct position. The forwardly directed head of the bird will, as a result of the circumferential recess of the smooth roll, be positioned just past the rotation axis of this roll, thus effectively avoiding a rotation of the bird, which is now not desired. The rough roll then engages the body of the bird and pushes it forward.

The previously mentioned bird guide has a double effect. Firstly, the supplied birds, which are generally spreaded along the width of the belt conveyor, are correctly guided towards the passage between the positioning means. Secondly, the velocity component caused by the inclined position of the bird guide in the direction of the smooth positioning means creates the effect described above.

In order to optimally guide the birds spread along the width of the belt conveyor towards the passage, an embodiment is advantageous in which the guide plates provide a narrowing bird guide.

Finally and embodiment of the apparatus according to the invention is described, in which at least one of the positioning means is spring-loaded and movable towards the passage. As a result, an automatic adaption of the apparatus to birds having different dimensions may be obtained without diminishing the effectiveness of the apparatus.

Hereinafter the invention will be elucidated referring to the drawing, in which two embodiments of the apparatus according to the invention are illustrated.

DETAILED DESCRIPTION OF THE PREFERRED EMBODIMENTS

Figure 1:
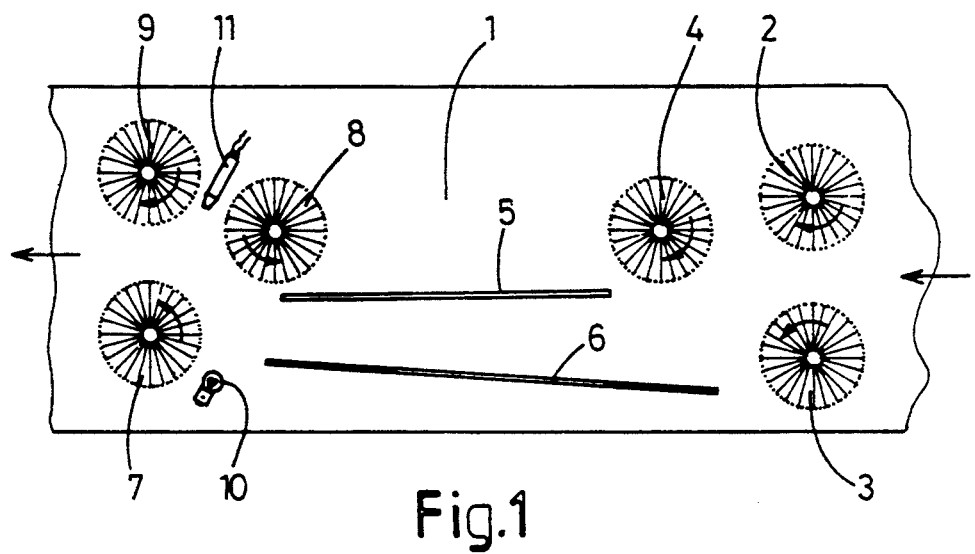
FIG. 1 shows, schematically, a top plan view of a first embodiment, the apparatus according to the invention.

Reference will now be made in detail to the presently preferred embodiments of the invention, one or more examples of which are illustrated in the accompanying drawings. Each example is provided by way of explanation of the invention, not limitation of the invention. The numbering of components in the drawings is consistent throughout the application with the same components having the same number in each of the drawings.

In the top plan view of FIG. 1, a conveyor 1, for example belt conveyor, is visible, of which the direction of conveyance is indicated by an arrow. In the direction of conveyance of the conveyor 1, successively two rolls 2 and 3, a guiding roll 4, two guide plates 5 and 6, positioning means 7 and 8, and an auxiliary positioning means 9 are visible. The function of these elements will now be described.

Both rolls 2, 3 rotate around their vertical axes, and define therebetween a passage. The direction of rotation of the rolls 2, 3 is such that both have a circumferential velocity directed in the direction of conveyance of the conveyor 1. By means of these rolls 2, 3 birds, which are sitting transversally to the direction of conveyance of the conveyor 1, can be positioned with their head or their tail in the direction of conveyance.

These rolls 2, 3 may comprise rotating brushes. It is also possible to apply more pairs to rolls.

The guide roll 4 also rotates around a vertical axis in the direction indicated by an arrow. Using this guide roll 4 birds, which have passed the passage between the rolls 2, 3 are supplied to a guide, which exists of two guide plates 5, 6. The guide plates 5, 6 might define a guide which narrows in the direction of conveyance of the conveyor 1. While passing the guide plates 5, 6, the birds remain positioned with their head or tail facing in the direction of conveyance.

Behind the guide plates 5, 6 the pair of positioning means 7, 8 is located, which in the shown embodiment also comprise brushes rotating around vertical axes. Between themselves the positioning means 7, 8 again define a passage for the birds. The direction of rotation of the positioning means 7, 8 appears from the indicated arrows. The circumferential velocity of the positioning means 7 at the passage is substantially directed in the direction of conveyance, whereas the circumferential velocity of the positioning means 8 is directed opposite to the direction of conveyance.

Using the positioning means 7, 8 all birds are directed with their head in the direction of conveyance. In this aspect also a light source 10 and an air jet-emitting element 11 are of use. The operation thereof will be elucidated later referring to FIGS. 2 and 3. Behind the positioning means 8, an auxiliary positioning means 9 is located, which together with the positioning means 7 again defines a passage for the birds.

Figure 2:
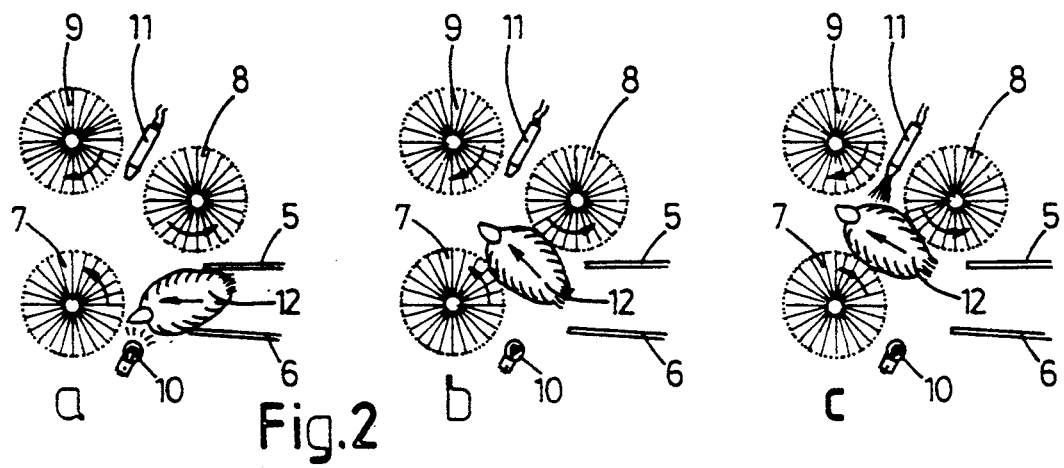
FIGS. 2(a–c) shows in three steps the passage of an already correctly positioned bird through the last section of the apparatus of FIG. 1.

In FIG. 2 the situation is represented in which a bird 12 has just passed the guide plates 5 and 6. The light source 10 is switched on, such that it attracts the attention of the bird. The bird will engage the positioning means with its head.

The light source 10 should prevent the bird, after passing the guide plates 5 and 6, from pressing its head against the positioning means 8, thus running the risk of being rotated backwards. Entrained by the rough surface of the positioning means 7, the bird reaches the position which is shown in FIG. 2b. Indeed the surface of the positioning means 8 rotates against the bird, but in the direction of the feathers, such that hardly a force can be exerted on the bird and it can pass the passage between the positioning means 7 and 8, also helped by the propelling force of the positioning means 7 and of the conveyor 1.

Next, the element 11 is switched on for emitting an air-jet (FIG. 2c), so that the bird moves its head away from the positioning means 8 and enters the passage between the auxiliary positioning means 9 and the positioning means 7 and is discharged further in the direction of conveyance of the conveyor 1.

It is not necessary that the light source 10 and the element 11 are continuously switched on; this can occur at the appropriate moments.

Figure 3:
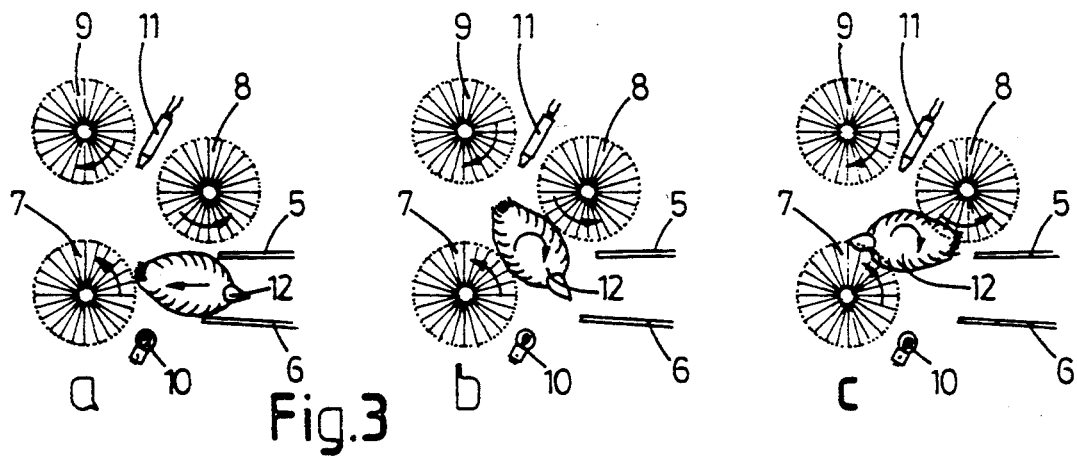
FIGS. 3(a–d) shows the passage of a bird positioned backwards.

In FIG. 3 the situation is illustrated, in which a bird has passed the guide plates 5, 6 facing with its tail in the direction of conveyance. Preferably the light source is switched on. Now the bird 12 engages the positioning means 7 with its tail and thus is rotated with its tail in the direction of the positioning means 8. In the situation represented in FIG. 3b also the positioning means 8 engages the bird and moves opposite to the direction of the feathers. As a result the bird 12 obtains a rotation around its vertical axis, helped by the rotation of the positioning means 7. The head of the bird 12 will pass the positioning means 7 and, in correspondence with FIG. 3c, the bird will be rotated with its head in the direction of conveyance. As a result, the situation in correspondence with FIG. 2c is obtained, whereafter a further discharge of the bird may occur in a corresponding way.

From the above it appears that, irrespective of the way in which the birds are supplied, birds can be oriented with their head in the direction of conveyance using the apparatus.

The rolls 2 and 3, the guide roll 4, the positioning means 7 and 8 and the auxiliary positioning means 9 may be mounted displaceable, to take account for birds having different dimensions.

Figures 4, 5:
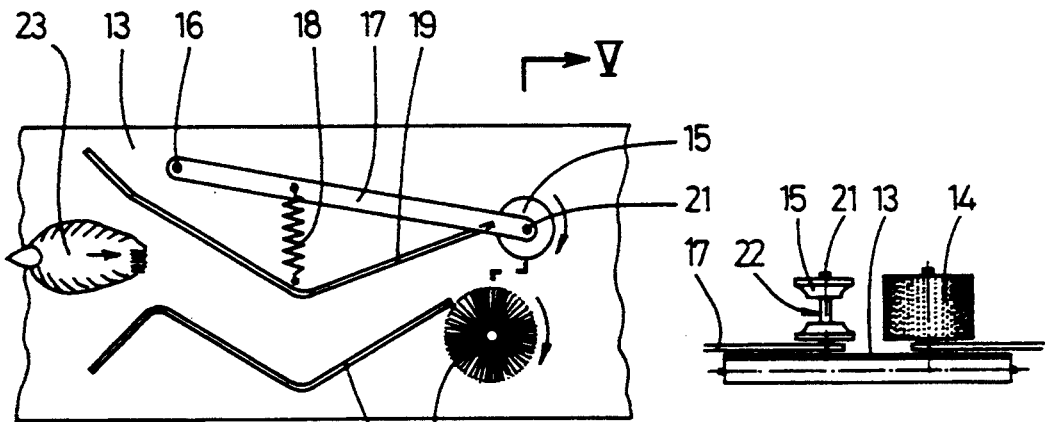
FIG. 4 shows, schematically, a top plan view of a second embodiment of the apparatus according to the invention.
FIG. 5 shows a view according to V—V in FIG. 4.

In FIG. 4 a top plan view of a part of a belt conveyor 13 is visible which, as seen in FIG. 4, moves birds from the left to the right. At a short distance above this belt conveyor 13, two positioning means 14, 15 are provided shaped as rolls and located alongside each other substantially transverse to the direction of conveyance. Between each other the positioning means 14 and 15 define a passage for the birds.

The one positioning roll 14, assuming a stationary position, is shaped as a brush having a rough surface. The other positioning roll 15 has a smooth surface and is attached to an arm 17 pivotable around a pivot point 16 and being spring-loaded by a spring 18.

Ahead of the positioning rolls 14 and 15, a stationary bird guide is provided having a narrowing shape, the last section of which comprises a first guide plate 19 in the extension of which substantially the rotational axis 21 of the smooth positioning roll 15 is located, and a second guide plate 20, the extension of which is substance touches the circumference of the rough positioning roll 14 facing the passage.

As appears clearly from FIG. 5, the smooth positioning roll 15 is provided with a circumferential recess 22 at the level of the head of supplied birds.

The positioning rolls 14 and 15 are rotated in directions indicated by arrows in FIG. 4.

Figure 6:
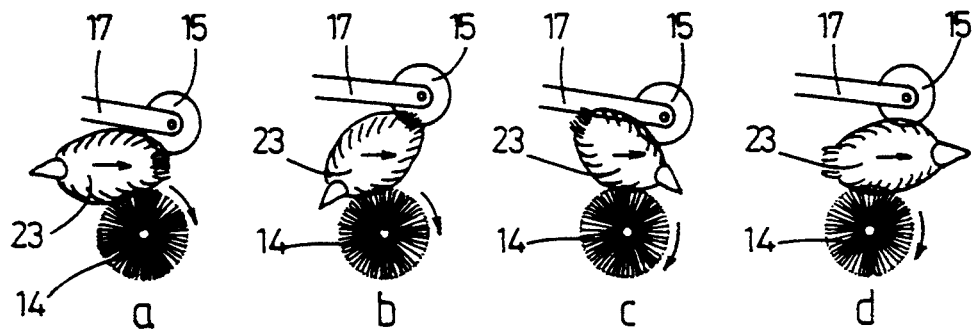
FIGS. 6(a–d) shows in four successive steps the operation of the apparatus shown in FIG. 4.

A bird 23 being supplied as indicated in FIG. 4 (thus facing with its tail in the direction of conveyance) will enter said bird guide and will be guided in the direction of the positioning rolls 14 and 15 by these plates 19 and 20. Because the tail of the bird 23 engages the guide 20 the bird tries to twist its tail somewhat in the direction of the guide plate 19. As a result, this tail will be effectively engaged by the smooth positioning wall 15, whereas at the same moment the rough positioning roll 14 will engage the bird 23, especially its head. Thus, as seen in FIG. 6 an anti-clockwise rotation of the bird 23 will occur. Like this the bird is positioned facing with its head in the direction of conveyance.

This effect is also shown in FIG. 6. In FIG. 6a the moment is visible at which the bird 23 has reached the passage between the positioning rolls 14 and 15 after leaving the channel between the guide plates 19 and 20. The bird 23 engages with its tail the smooth positioning roll 15 and engages with its body or its head the rough positioning roll 14. As a result the bird will successively assume the positions substantially in correspondence with FIGS. 6b, 6c and 6d. During rotation of the bird, the smooth positioning roll 15 may move through a pivoting of the arm 17 against the load of the spring 18 (see FIG. 4).

When a bird passes the channel between the guide plates 19 and 20 facing with its head in the direction of conveyance, as seen in FIG. 4, the head of said bird generally will project through the circumferential recess 22 past the rotation axis 21 of the smooth positioning roll 15, such that this smooth positioning roll can hardly engage the bird. The rough positioning roll 14 however engages the body of the bird, such that the bird is only moved forward in the direction of conveyance without any rotation.

It is noted, that, instead of the illustrated rolls, the positioning means also might comprise conveyor belts defining a passage therebetween.

It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents.

I claim:

1. An apparatus for orienting birds supplied by a conveyor device so that the birds are oriented with their heads in the direction of conveyance, said apparatus comprising:
    two positioning members configured to rotate about vertical axes, said positioning members defining a passage therebetween for the birds to be oriented, said positioning members configured to rotate so that one positioning member has a circumferential velocity directed in the direction of conveyance and said other positioning member has a circumferential velocity directed opposite the direction of conveyance; and
    an auxiliary device configured to supply the birds to said positioning members with their head or tail facing in the direction of conveyance.

2. The apparatus as in claim 1, further comprising a light source disposed at the side of one of said positioning members which faces away from said passage.

3. The apparatus as in claim 2, further comprising an air-jet emitting element disposed generally at the side of said other positioning member and oriented so as to direct an air-jet generally towards said passage.

4. The apparatus as in claim 1, further comprising an auxiliary positioning member rotatable about a vertical axis and disposed generally behind said other positioning member in the direction of conveyance and which together with said one positioning member defines a passage for the birds and which at said passage has a circumferential velocity directed in the direction of conveyance, said one positioning member and said auxiliary positioning member being positioned alongside each other substantially transverse to the direction of conveyance, said other positioning member and said one positioning member being staggered relative each other in the direction of conveyance.

5. The apparatus as in claim 1, wherein said auxiliary device comprises at least two rolls rotating around a vertical axis and defining a passage for the birds at which said rolls have a circumferential velocity in the direction of conveyance.

6. The apparatus as in claim 5, further comprising a stationary bird guide disposed between said rolls and said positioning members, said guide configured to prevent rotation of the birds within said guide.

7. The apparatus as in claim 6, wherein said guide comprises two guide plates defining a passage for the birds therebetween.

8. The apparatus as in claim 7, further comprising at least one guide roll disposed between said rolls and said guide plates in the direction of conveyance.

9. The apparatus as in claim 1, wherein at least one of said positioning members comprises a rough surface.

10. The apparatus as in claim 9, wherein said positioning member having said rough surface comprises a brush.

11. The apparatus as in claim 1, wherein said one positioning member has a rough surface and said other positioning member has a smooth surface, said rough positioning member having a circumferential velocity directed in the direction of conveyance and said smooth positioning member having a circumferential velocity directed opposite to the direction of conveyance, said smooth positioning means further comprising a circumferential recess at the level of the head of birds to be supplied.

12. The apparatus as in claim 11, wherein said positioning members comprise rolls.

13. The apparatus as in claim 12, wherein said smooth positioning member comprises an hour glass shape.

14. The apparatus as in claim 11, wherein said rough positioning member comprises a brush.

15. The apparatus as in claim 12, wherein said smooth roll is staggered relative said rough roll in the direction of conveyance, whereas ahead of said rolls a bird guide is provided extending under an angle relative to the direction of conveyance and substantially towards said smooth roll.

16. The apparatus as in claim 15, wherein said bird guide comprises a first guide plate and a second guide plate, substantially in the extension of said first guide plate is positioned the rotational axis of the smooth roll and the extension of said second guide plate is substantially at the circumference of said rough roll.

17. The apparatus as in claim 16, wherein said guide plates define a narrowing bird guide in the direction of conveyance.

18. The apparatus as in claim 11, wherein at least one of said positioning members is spring-loaded towards said passage.

* * * * *